(12) United States Patent
Kasuya

(10) Patent No.: US 7,097,177 B2
(45) Date of Patent: Aug. 29, 2006

(54) METAL LAMINATE GASKET

(75) Inventor: Tadashi Kasuya, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 11/067,931

(22) Filed: Mar. 1, 2005

(65) Prior Publication Data

US 2005/0200085 A1 Sep. 15, 2005

(30) Foreign Application Priority Data

Mar. 9, 2004 (JP) .............................. 2004-065781

(51) Int. Cl.
*F02F 11/00* (2006.01)

(52) U.S. Cl. ...................... 277/592; 277/652; 277/653; 277/654

(58) Field of Classification Search ................ 277/592, 277/598, 594, 596, 650–654

See application file for complete search history.

(56) References Cited

U.S. PATENT DOCUMENTS

| | | | | |
|---|---|---|---|---|
| 1,793,424 A | * | 2/1931 | Fitzgerald | 277/601 |
| 4,223,897 A | * | 9/1980 | Staab et al. | 277/592 |
| 4,254,963 A | * | 3/1981 | Skrycki | 277/592 |
| 4,397,472 A | * | 8/1983 | Czernik | 277/592 |
| 4,402,518 A | * | 9/1983 | Locacius | 277/592 |
| 4,739,999 A | * | 4/1988 | Ishii et al. | 277/595 |
| 4,896,891 A | * | 1/1990 | Udagawa | 277/593 |
| 4,898,396 A | * | 2/1990 | Udagawa | 277/592 |
| 4,993,720 A | * | 2/1991 | Ciotola | 277/641 |
| 5,150,910 A | * | 9/1992 | Udagawa | 277/592 |
| 5,368,315 A | * | 11/1994 | Viksne | 277/592 |
| 5,368,316 A | * | 11/1994 | Miyaoh | 277/591 |
| 5,472,217 A | * | 12/1995 | Hagiwara et al. | 277/596 |
| 5,586,770 A | * | 12/1996 | Udagawa et al. | 277/598 |
| 5,642,893 A | * | 7/1997 | Udagawa | 277/592 |
| 6,241,253 B1 | * | 6/2001 | Dempsey et al. | 277/596 |
| 6,250,644 B1 | * | 6/2001 | Diez et al. | 277/595 |
| 6,517,085 B1 | * | 2/2003 | Udagawa et al. | 277/592 |
| 6,565,097 B1 | * | 5/2003 | Jinno | 277/592 |
| 6,582,172 B1 | * | 6/2003 | Nickerson et al. | 411/371.1 |
| 6,682,080 B1 | * | 1/2004 | Miyaoh | 277/592 |
| 6,688,606 B1 | * | 2/2004 | Hohe et al. | 277/600 |
| 6,705,618 B1 | * | 3/2004 | Jinno et al. | 277/593 |
| 6,896,271 B1 | * | 5/2005 | Uchida et al. | 277/593 |
| 6,945,538 B1 | * | 9/2005 | Novil et al. | 277/591 |
| 2002/0017763 A1 | * | 2/2002 | Udagawa et al. | 277/592 |

FOREIGN PATENT DOCUMENTS

EP 0 464 888 A1 1/1992

* cited by examiner

*Primary Examiner*—Suzanne Barrett
*Assistant Examiner*—Jonathan Liu
(74) *Attorney, Agent, or Firm*—Manabu Kanesaka

(57) ABSTRACT

A metal laminate gasket with a hole to be sealed includes a base metal plate having a first hole corresponding to the hole to be sealed, and a first steel plate laminated on one side of the base metal plate and having a second hole with a diameter greater than that of the first hole. The second hole has an inner surface and is aligned with the first hole when the base metal plate and the first steel plate are laminated. A coating layer is deposited on the first steel plate and has a portion deposited on the inner surface of the second hole.

9 Claims, 1 Drawing Sheet

METAL LAMINATE GASKET

BACKGROUND OF THE INVENTION AND RELATED ART STATEMENT

The present invention relates to a metal laminate gasket suitable for a cylinder head gasket and so on.

Conventionally, in a metal laminate cylinder head gasket, there is a gasket having a steel plate as one of metal plates. FIG. 3 shows an example showing an area around a water hole, in which a plate 11 formed of a stainless material and a plate 12 formed of the above explained steel plate are combined. Generally, upper and lower surfaces of the steel plate are plated to form plated layers 13 for preventing rust. In the figure, numeral 14 shows a coating layer for sealing.

However, no consideration for preventing rust is made at a cut surface 12a of an edge, such as an edge of a water hole punched in the steel plate 12, in which rust and corrosion are likely to occur, because the area is very small and it takes time for processing. However, it is desirous to provide a rust preventing process at the cut surface. A specific procedure for rust preventing process must be avoided because of increasing of cost.

The basic technical feature of present invention is to provide a metal laminate gasket in which a rust and corrosion prevention process is applied to a cut surface around an edge, such as a water hole and so on, in a steel plate.

Another technical feature of the invention is to provide a metal laminate gasket, in which a rust and corrosion prevention process can be made without a specific additional process in providing the rust and corrosion preventing process at the cut surface around the edge in the steel plate.

Further objects and advantages of the invention will be apparent from the following description of the invention.

SUMMARY OF THE INVENTION

In order to solve the above problems, in a metal laminate gasket using a steel plate as one of metal plates of the invention, a hole with an edge to have rust and corrosion preventing process in the steel plate is made as an enlarged hole, which is slightly greater than a standard hole diameter of another laminate plate. In a condition that the steel plate is laminated as an outer plate, a coating layer is formed. The coating layer is applied in a range smaller than the enlarged hole, so that the edge of the enlarged hole is covered by the coating layer.

In the metal laminate gasket of the invention, the steel plate is laminated on one side or both sides with respect to a plate made of a stainless material.

Also, in a preferred embodiment of the invention, the above enlarged hole is made largely to have a width of several millimeters circumferentially with respect to the standard hole.

In the metal laminate gasket with the above structure, the hole applied with the rust and corrosion prevention process in the steel plate is made as the enlarged hole greater in diameter than the standard hole diameter in another laminate plate, and the coating layer is made in a range smaller than the enlarged hole. Thus, the coating is made in the cut surface around the edge of the enlarged hole in forming the coating, by which the rust and corrosion prevention process is made at the cut surface.

In the metal laminate gasket of the invention as explained above, in forming the rust and corrosion prevention process at the cut surface of the edge of a water hole and so on in the steel plate, the rust and corrosion prevention process can be made without a specific process. The rust and corrosion prevention process can be made easily.

DETAILED DESCRIPTION OF THE PREFERRED EMBODIMENTS

The embodiments of the invention will be explained in detail with reference to the drawings.

Figure 1:
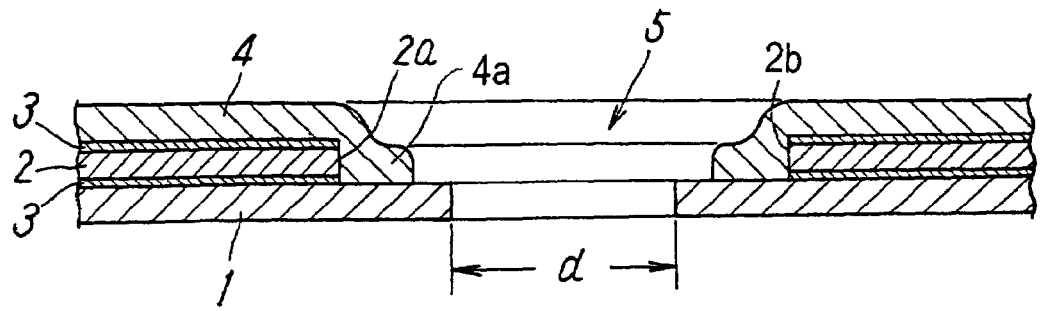
FIG. 1 is an enlarged sectional view for an important part showing a structure of a first embodiment of a metal laminate gasket of the invention.

FIG. 1 shows a structure around a water hole of the first embodiment of the metal laminate gasket, which is interposed between a cylinder block and a cylinder head.

The metal laminate gasket is formed by laminating on a stainless laminate plate 1 a steel laminate plate 2 applied with plated layers 3 for rust prevention on front and rear surfaces thereof. The laminate plates 1, 2 include cylinder chamber holes (not shown) corresponding to a cylinder bore of the cylinder block, water holes, oil holes and so on, but the water hole 5 is only shown.

In the above gasket, the steel laminate plate 2 is formed to have an enlarged hole 2b slightly larger than a standard hole with a diameter d in the stainless laminate plate 1, wherein the enlarged hole is formed by punching and has an edge around the water hole 5 with a cut surface 2a applied with a rust or corrosion prevention process. In a condition that the steel laminate plate 2 is laminated on the plate 1, a coating layer 4 for sealing is formed on an outer surface. The coating layer 4 is applied in a range at least smaller than the enlarged hole to thereby cover the cut surface 2a around the edge of the enlarged hole by the coating layer 4.

Accordingly, there is no additional process in forming the coating layer 4 on the above cut surface 2a. Also, in forming the coating layer 4 on the outer surface of the steel plate 2, the coating layer 4 is simply applied in the range smaller than the enlarged hole, so that the coating layer 4 is formed on the cut surface 2a around the edge of the enlarged hole along with this coating. A portion 4a of the coating layer 4 is deposited on the stainless laminate plate 1.

In the above metal laminate gasket, it is desirable to form the enlarged hole of the metal plate 2 to have a width of several millimeters, e.g. 2–3 mm, around the entire periphery thereof greater than the standard hole diameter. Also, the laminate plate may be provided with, as required, beads around several holes.

Here, it is explained that the coating layer 4 is covered on the cut surface 2a around the edge of the water hole 5 of the cylinder head gasket, but the present invention can be applied to other holes which require rust and corrosion prevention process.

In the metal laminate gasket of the first embodiment shown in FIG. 1, the laminate plate 1 made of stainless material and the laminate plate 2 made of steel are laminated. However, the present invention can be applied to a metal laminate gasket using a laminate plate 2 made of steel. Actually, it is not limited to the embodiment of FIG. 1, but the invention can be applied to a metal laminate gasket, wherein laminate plates 2, 6 made of steel are laminated on both sides of the laminate plate 1 made of stainless material.

Figure 2:
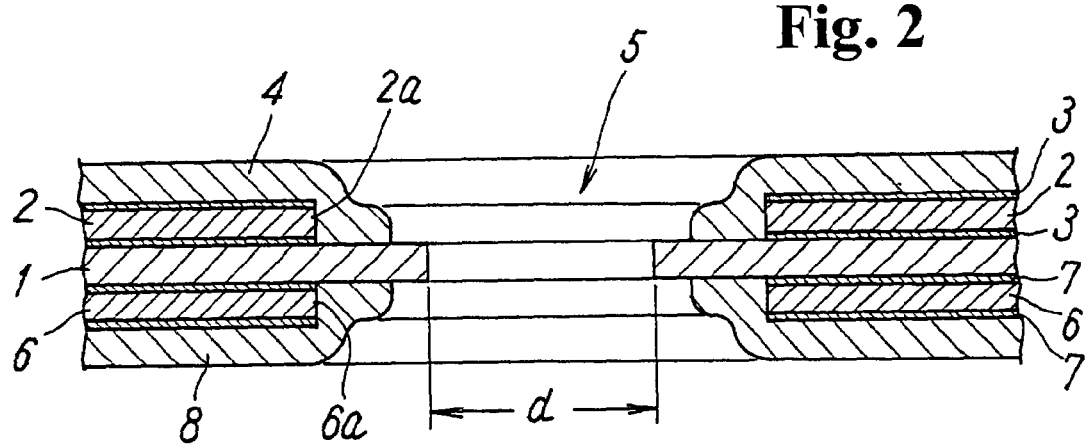
FIG. 2 is an enlarged sectional view of the second embodiment of the metal laminate gasket of the invention.
Figure 3:
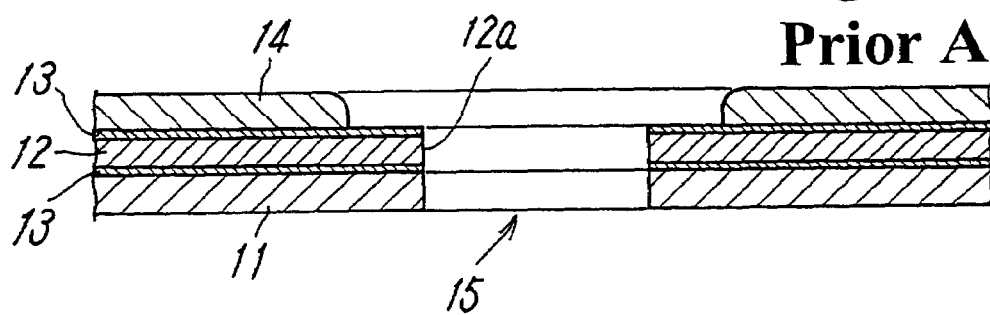
FIG. 3 is an enlarged sectional view for an important part of a conventional metal laminate gasket.

The metal laminate gasket of the second embodiment shown in FIG. 2 has, similar to the first embodiment, a structure around a water hole of a cylinder head gasket of an internal combustion engine. The metal laminate gasket is structured by laminating, on front and rear sides of the stainless laminate plate 1, steel laminate plates 2, 6 applied with plated layers 3, 7 for rust prevention on front and rear surfaces.

In the above gasket, the steel laminate plates 2, 6 are formed to have enlarged holes slightly larger than a standard hole diameter d in the stainless laminate plate 1, wherein the enlarged holes are formed by punching and have edges around the water hole 5 with cut surfaces 2a, 6a to have rust or corrosion preventing process. In a condition that the steel laminate plates 2, 6 are laminated on front and rear sides of the laminate plate 1, coating layers 4, 8 for sealing are formed on the outer surfaces thereof. The coating layers 4, 8 are applied in a range at least smaller than the enlarged holes to thereby cover the cut surfaces 2a, 6a around the edges of the enlarged hole by the coating layers 4, 8.

Herein, since other structure and operation of the metal laminate gasket shown in FIG. 2 are substantially the same as those of the metal laminate gasket explained in FIG. 1, the same or similar parts are assigned with the same numerals, and explanation thereof is omitted.

The disclosure of Japanese Patent Application No. 2004-065781 filed on Mar. 9, 2004 is incorporated in the application.

While the invention has been explained with reference to the specific embodiments of the invention, the explanation is illustrative, and the invention is limited by the appended claims.

What is claimed is:

1. A metal laminate gasket having a hole to be sealed, comprising:
    a base metal plate having a first hole corresponding to the hole to be sealed,
    a first steel plate laminated on one side of the base metal plate and having a second hole with a diameter greater than that of the first hole, said second hole having an inner surface and being aligned with the first hole when the base metal plate and the first steel plate are laminated,
    plated layers formed on upper and lower surfaces of the first steel plate without covering the inner surface of the first steel plate, and
    a coating layer deposited on the upper surface of the first steel plate, the inner surface of the second hole and the base metal plate inside the second hole.

2. A metal laminate gasket according to claim 1, wherein said coating layer covers a part of the base metal plate between the first hole and the second hole without covering inner and upper portions adjacent the first hole.

3. A metal laminate gasket according to claim 2, wherein said base metal plate is made of stainless metal plate.

4. A metal laminate gasket according to claim 2, wherein said part of the base metal plate between the first hole and the second hole extends circularly around the second hole, and has a width of about 2–3 mm.

5. A metal laminate gasket according to claim 1, further comprising a second steel plate laminated on the other side of the base metal plate and having a third hole with a diameter greater than that of the first hole, said third hole having an inner surface and being aligned with the first and second holes when the base metal plate and the first and second steel plates are laminated, and another coating layer deposited on the second steel plate and having a portion deposited on the inner surface of the third hole and the base metal plate inside the third hole.

6. A metal laminate gasket according to claim 5, wherein said second steel plate includes plated layers formed on upper and lower surfaces thereof without covering the inner surface of the second steel plate.

7. A metal laminate gasket according to claim 6, wherein said second steel plate and the another coating layer are symmetrically arranged with the first steel plate and the coating layer with respect to the base metal plate.

8. A metal laminate gasket according to claim 1, wherein said base metal plate and said first steel plate constitute the metal laminate gasket.

9. A metal laminate gasket according to claim 8, wherein said base metal plate and said first steel plate includes cylinder chamber holes, water holes, oil holes and water holes.

* * * * *